(12) United States Patent
Gustavson et al.

(10) Patent No.: US 8,645,447 B2
(45) Date of Patent: Feb. 4, 2014

(54) METHOD AND STRUCTURE FOR CACHE AWARE TRANSPOSITION VIA RECTANGULAR SUBSECTIONS

(75) Inventors: Fred Gehrung Gustavson, Briarcliff Manor, NY (US); John A. Gunnels, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 2357 days.

(21) Appl. No.: 11/035,933

(22) Filed: Jan. 14, 2005

(65) Prior Publication Data

US 2006/0161607 A1   Jul. 20, 2006

(51) Int. Cl.
    *G06F 17/14* (2006.01)

(52) U.S. Cl.
    USPC .......................................................... 708/400

(58) Field of Classification Search
    USPC .......................................................... 708/400
    See application file for complete search history.

(56) References Cited

U.S. PATENT DOCUMENTS 7,031,994 B2 *  4/2006  Lao et al. ...................... 708/400
7,231,413 B2 *  6/2007  Natsume ....................... 708/401

* cited by examiner

*Primary Examiner* — David H Malzahn
(74) *Attorney, Agent, or Firm* — Daniel P. Morris; McGinn IP Law Group, PLLC

(57) ABSTRACT

A method and structure for transposing a rectangular matrix A in a computer includes subdividing the rectangular matrix A into one or more square submatrices and executing an in-place transposition for each of the square submatrices $A_{ij}$.

20 Claims, 13 Drawing Sheets

$$A = \begin{vmatrix} 1 & 5 \\ 2 & 6 \\ 3 & 7 \\ 4 & 8 \end{vmatrix} \xrightarrow{[T:a_{ij} \leftrightarrow a_{ji}]} A' = \begin{vmatrix} 1 & 2 & 3 & 4 \\ 5 & 6 & 7 & 8 \end{vmatrix}$$

(Total Storage = 2m x n)

FIG.1
PRIOR ART $$A = \begin{vmatrix} 1 & 4 & 7 \\ 2 & 5 & 8 \\ 3 & 6 & 9 \end{vmatrix} \xrightarrow{[T]} A' = \begin{vmatrix} 1 & 2 & 3 \\ 4 & 5 & 6 \\ 7 & 8 & 9 \end{vmatrix}$$

(Total Storage = n x n)

FIG.2

$$A = \begin{vmatrix} 1 & 5 \\ 2 & 6 \\ 3 & 7 \\ 4 & 8 \end{vmatrix} \xrightarrow{[T]} A' = \begin{vmatrix} 1 & 2 & 3 & 4 \\ 5 & 6 & 7 & 8 \end{vmatrix}$$

$q = 2$
$r = 0$

Transpose in-place square submatrices:

$$A(1:2, 1:2) = \begin{vmatrix} 1 & 5 \\ 2 & 6 \end{vmatrix} \quad 402$$

and $$A(3:4, 1:2) = \begin{vmatrix} 3 & 7 \\ 4 & 8 \end{vmatrix} \quad 403$$

To get:

$$A = \begin{vmatrix} 1 & 2 \\ 5 & 6 \\ 3 & 4 \\ 7 & 8 \end{vmatrix} \begin{array}{l} \phantom{x} 405 \\ \\ \phantom{x} 406 \end{array}$$

Note: In terms of the original matrix data array notation, the M=4 columns of A' are length N=2 stride-one vectors at M=4 (i,j) locations (1,1), (1,2), (3,1), and (3,2)

$$A = \begin{vmatrix} 1 & 2 & 3 & 4 \\ 5 & 6 & 7 & 8 \end{vmatrix} \xrightarrow{[T]} A' = \begin{vmatrix} 1 & 5 \\ 2 & 6 \\ 3 & 7 \\ 4 & 8 \end{vmatrix}$$

500

502

$$q = 2$$
$$r = 0$$

Transpose in-place square submatrices:

$$A(1:2, 1:2) = \begin{vmatrix} 1 & 2 \\ 5 & 6 \end{vmatrix} \quad \text{— 503}$$

and $$A(1:2, 3:4) = \begin{vmatrix} 3 & 4 \\ 7 & 8 \end{vmatrix} \quad \text{— 504}$$

To get:

$$A' = \begin{vmatrix} 1 & 5 \\ 2 & 6 \end{vmatrix} \begin{vmatrix} 3 & 7 \\ 4 & 8 \end{vmatrix}$$

505  506

Note: The M=2 columns of A' are the concatenation of N=2 stride-one vectors in col(1,3) and col(2,4) of the original matrix data array notation.

FIG.5

$$A = \begin{vmatrix} 1 & 9 & 17 \\ 2 & 10 & 18 \\ 3 & 11 & 19 \\ 4 & 12 & 20 \\ 5 & 13 & 21 \\ 6 & 14 & 22 \\ 7 & 15 & 23 \\ 8 & 16 & 24 \end{vmatrix} \xrightarrow{[T]} A' = \begin{vmatrix} 1 & 2 & 3 & 4 & 5 & 6 & 7 & 8 \\ 9 & 10 & 11 & 12 & 13 & 14 & 15 & 16 \\ 17 & 18 & 19 & 20 & 21 & 22 & 23 & 24 \end{vmatrix}$$

601, 602, 600, (M=8, N=3)

1st PASS —— 603

$q = 2$ $r = 2$

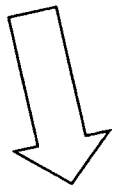

Form q=2 square transpose submatrices of order 3

$$A'(1:3,1:3) = \begin{vmatrix} 1 & 2 & 3 \\ 9 & 10 & 11 \\ 17 & 18 & 19 \end{vmatrix}$$ —— 604

$$A'(4:6,1:3) = \begin{vmatrix} 4 & 5 & 6 \\ 12 & 13 & 14 \\ 20 & 21 & 22 \end{vmatrix}$$ —— 605    606

+ Remainder $\tilde{A} = A(7:8,1:3) = \begin{vmatrix} 7 & 15 & 23 \\ 8 & 16 & 24 \end{vmatrix}$

Go to 2nd PASS (FIG.6B)

FIG.6A

607 Remainder $\tilde{A} = A(7:8, 1:3) = \begin{vmatrix} 7 & 15 & 23 \\ 8 & 16 & 24 \end{vmatrix}$ 2nd PASS
M=2, N=3
Return to ENTER with
Remainder $\tilde{A} = A(7:8, 1:3)$ $q = 1$ $r = 1$ Form q=1 square transpose submatrices of order 2

$\tilde{A}(1:2, 1:2) = A(7:8, 1:2) = \begin{vmatrix} 7 & 8 \\ 15 & 16 \end{vmatrix}$ —609

+ Remainder $\tilde{\tilde{A}}(1:2, 1:1) = \tilde{A}(1:2, 3:3) = A(7:8, 3:3)$

610

Go to 3rd PASS (FIG.6C)

Remainder $\tilde{\tilde{A}}(1:2,1:1) = \tilde{A}(1:2,3:3) = A(7:8,3:3)$

3rd PASS —608
M=2, N=1
$q = 2$
$r = 0$
⎫ 613
⎬
⎭

Form q=2 square transpose submatrices of order 1

$\tilde{\tilde{A}}'_1(1:2,1:1) = \tilde{A}_1(1:2,3:3) = A(7:7,3:3) = |23|$ —611

$\tilde{\tilde{A}}'_2(1:2,1:1) = \tilde{A}'_2(1:2,3:3) = A(8:8,3:3) = |24|$ —612

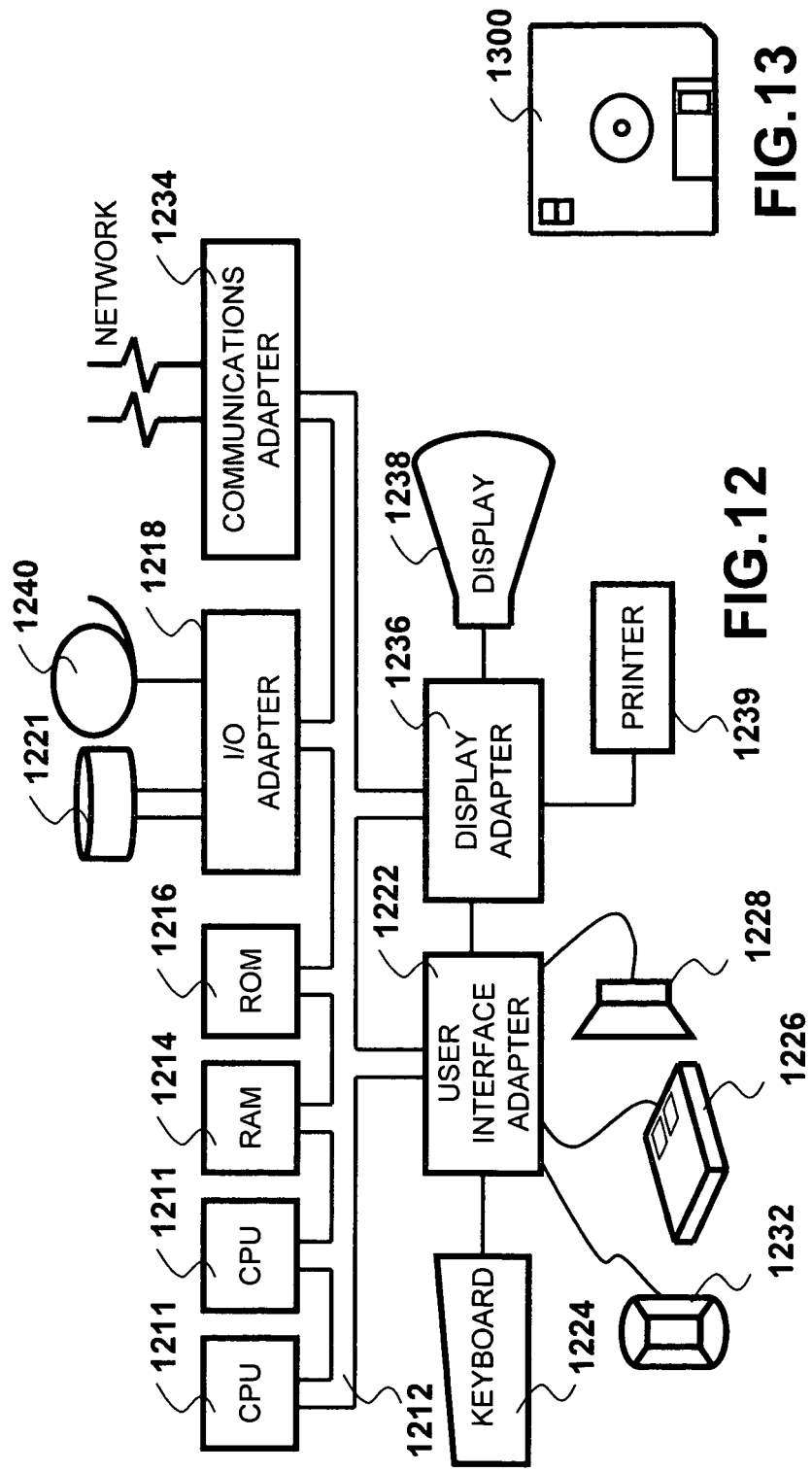

METHOD AND STRUCTURE FOR CACHE AWARE TRANSPOSITION VIA RECTANGULAR SUBSECTIONS

U.S. GOVERNMENT RIGHTS IN THE INVENTION

This invention was made with Government support under Contract No. B517552, awarded by the United States Department of Energy. The Government has certain rights in this invention,

BACKGROUND OF THE INVENTION

1. Field of the Invention

The present invention generally relates to providing efficiency in linear algebra subroutines. More specifically, a novel method saves both computer memory and improves performance by forming the transpose of a matrix A by subdividing the matrix A into one or more square submatrices $A_{ij}$ along a row or column direction, performing an in-place square matrix transposition on each square submatrix $A_{ij}$, to form transposed square submatrices $A_{ij}'$ and then forming, on the possible remaining leftover rectangular piece B of A, its transpose matrix B' by using a standard out-of-place transpose algorithm. The final transpose of matrix A is formed by connecting the square transposed part(s) $A_{ij}$ of the original of matrix A with B'.

2. Description of the Related Art

Scientific computing relies heavily on linear algebra. In fact, the whole field of engineering and scientific computing takes advantage of linear algebra for computations. Linear algebra routines are also used in games and graphics rendering. Typically, these linear algebra routines reside in a math library of a computer system that utilizes one or more linear algebra routines as a part of its processing. Linear algebra is also heavily used in analytic methods that include applications such as a supply chain management.

A number of methods have been used to improve performance from new or existing computer architectures for linear algebra routines. However, because linear algebra permeates so many calculations and applications, a need continues to exist to optimize performance, in any way possible, of matrix processing on a computer. Also, a new generation of computers requires possibly redoing or re-optimizing the previous, then-current, optimized programs, or at least "tweaking" them.

Linear Algebra Subroutines

The applications of the present invention include the matrix operation of transposition and is applicable in any environment in which used transposition is performed. An exemplary intended environment of the present invention is the computing standard called LAPACK (Linear Algebra PACKage) and to the various subroutines contained therein. Information on LAPACK is readily available on the Internet (e.g., reference the website at netlib.org).

For purpose of discussion only, Level 3 BLAS (Basic Linear Algebra Subprograms) of the LAPACK (Linear Algebra PACKage) are used, but it is intended to be understood that the concepts discussed herein are easily extended to other linear algebra mathematical standards and math library modules. Indeed, any routine or subroutine that involves matrix transposition would benefit by the method discussed herein.

When LAPACK is executed, the Basic Linear Algebra Subprograms (BLAS), unique for each computer architecture and provided by the computer vendor, are invoked. LAPACK comprises a number of factorization algorithms for linear algebra processing.

For example, Dense Linear Algebra Factorization Algorithms (DLAFAs) include matrix multiply subroutine calls, such as Double-precision Generalized Matrix Multiply (DGEMM). At the core of level 3 Basic Linear Algebra Subprograms (BLAS) are "L1 kernel" routines which are constructed to operate at near the peak rate of the machine when all data operands are streamed through or reside in the L1 cache.

The most heavily used type of level 3 L1 DGEMM kernel is Double-precision A Transpose multiplied by B (DATB), that is, $C=C-A^T*B$, where A, B, and C are generic matrices or submatrices, and the symbology $A^T$ means the transpose of matrix A. It is noted that DATB is usually the only such kernel employed by today's state of the art codes, although DATB is only one of six possible kernels.

The DATB kernel operates so as to keep the A operand matrix or submatrix resident in the L1 cache. Since A is transposed in this kernel, its dimensions are K1 by M1, where K1×M1 is roughly equal to the size of the L1. Matrix A can be viewed as being stored by row, since in Fortran, a non-transposed matrix is stored in column-major order and a transposed matrix is equivalent to a matrix stored in row-major order. Because of asymmetry (C is both read and written) K1 is usually made to be greater than M1, as this choice leads to superior performance.

Matrix transposition is an important sub-operation appearing in many matrix algorithms, such as solving dense linear systems, matrix multiply, and eigenvalue computations.

The conventional solution for matrix transposition, exemplarily represented in FIG. 1 as process 100, is to double the space and explicitly produce a copy of the transpose matrix 102, leaving the original matrix 101 intact. It is noted that the symbology "[T]" or "'" each represents the transposition operation.

The drawback to this conventional method is that both space and computer time (performance) is wasted, since, if A is a matrix of size m×n, then the transposition process 100 requires two copies of matrix data (e.g., 2 mn) be stored in memory. Therefore, any process that reduces the space or number of operations from this conventional method would improve performance of the matrix transposition operation.

This space and operational efficiency is of particular concern as dimensions m or n increase in size so that the matrix is too large to be brought into a cache memory in its entirety for processing of the entire matrix. That is, because dimensions m or n are now typically of the order of hundreds or thousands, linear algebra processing is done in a piecemeal manner, and even the simple process of matrix transposition becomes burdensome in both time and memory space for large matrices.

Therefore, because of the importance of matrix transposition in linear algebra, a need exists to improve the memory space and computer time required to execute matrix transposition.

SUMMARY OF THE INVENTION

In view of the foregoing, and other, exemplary problems, drawbacks, and disadvantages of the conventional systems, it is an exemplary feature of the present invention to provide a method (and structure) in which a rectangular matrix (in various formats) can be transposed quickly with little or no extra space in memory.

It is another exemplary feature of the present invention to provide a method for matrix transposition that saves both computer memory and improves performance of dense linear algebra programs.

Therefore, in a first exemplary aspect of the present invention, described herein is a method of transposing a rectangular matrix A in a computer, including subdividing the rectangular matrix A into one or more square submatrices $A_{ij}$ and executing an in-place transposition of these square submatrices $A_{ij}$. Any remaining rectangular part of A is then transposed by either an out-of-place transpose algorithm or, possibly, by sequentially repeating the square in-place method of the present invention.

In a second exemplary aspect of the present invention, described herein is a computer including a memory to store a matrix data to be transposed, a square sub-divider module to subdivide the matrix data into one or more square submatrices, and an in-place square transpose module to transpose each square submatrix to form the transpose of the square pieces of A.

In a third exemplary aspect of the present invention, described herein is a signal-bearing medium tangibly embodying a program of machine-readable instructions executable by a digital processing apparatus to perform a method of transposing a matrix data, the instructions including at least one of: a square sub-divider module to subdivide the matrix data into one or more submatrices, an in-place square transpose module to transpose each one or more square submatrices to form transposes inplace of the square submatrices, a re-organizer module to determine how each transposed square submatrix is fitted back to form a transposed matrix data, an extra space module to determine an amount of extra memory space to be reserved for a residual portion of the matrix data, and a control module to supervise and coordinate an operation of one or more of the square sub-divider module, the in-place square transpose module, and the re-organizer module.

In a fourth exemplary aspect of the present invention, described herein is an apparatus including means to subdivide a matrix data into one or more square submatrices of data and means to execute an in-place square matrix transposition.

Thus, it can be seen that the present invention provides a method to perform matrix transposition in a more efficient manner relative to the conventional method.

BRIEF DESCRIPTION OF THE DRAWINGS

The foregoing and other purposes, aspects and advantages will be better understood from the following detailed description of an exemplary embodiment of the invention with reference to the drawings, in which:

FIG. 1 shows a conventional matrix transposition process 100;

FIG. 2 shows how a matrix transposition process 200 of a square matrix can be executed in place;

FIG. 4 shows visually a process 400 of the transposition technique of the present invention as applied to a matrix A having more rows than columns (e.g., m>n) and that can be completely broken down into square submatrices $A_{ij}$ so that no extra storage is required;

FIG. 5 shows visually a process 500 of the transposition technique of the present invention as applied to a matrix A having more columns than rows (e.g., n>m) and that can be completely broken down into square submatrices $A_{ij}$ so that no extra storage is required;

FIG. 6A shows visually a first pass 603 of a process 600 of the transposition technique of the present invention as applied to a matrix A having size 8×3 (e.g., M>N) and that is finally completely broken down into square submatrices $A_i$ of size 1×1 in three passes through the flowchart 300 shown in FIG. 3;

FIG. 12 illustrates an exemplary hardware/information handling system 1200 for incorporating the present invention therein; and FIG. 13 illustrates a signal bearing medium 1300 (e.g., storage medium) for storing steps of a program of a method according to the present invention.

DETAILED DESCRIPTION OF EXEMPLARY EMBODIMENTS OF THE INVENTION

Figure 3:
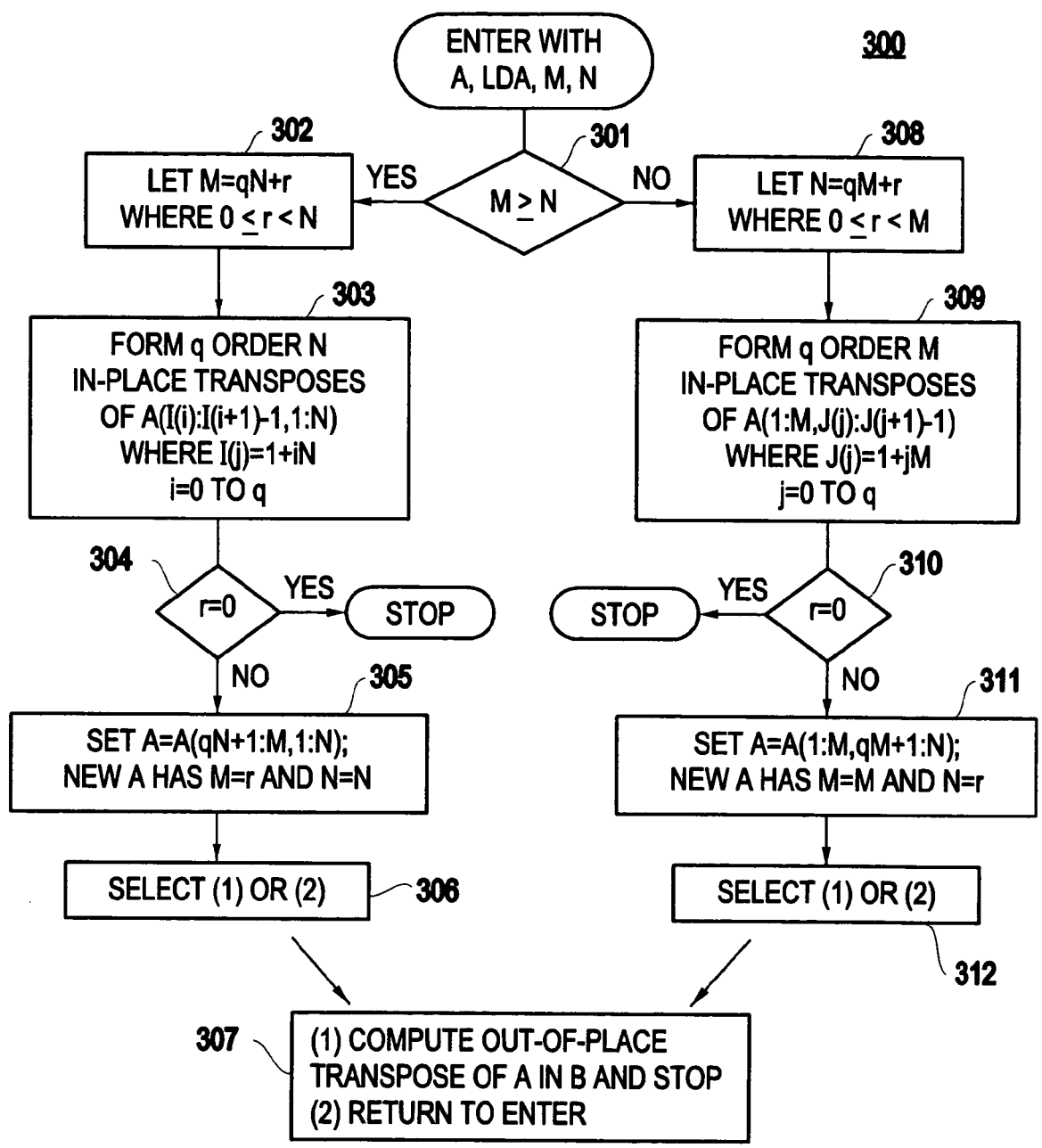
FIG. 3 shows a flowchart 300 that summarizes a technique of transposition for any matrix A in accordance with the method of the present invention.

Referring now to the drawings, and more particularly to FIGS. 2-13, exemplary embodiments of the method and structures according to the present invention will now be described.

As demonstrated in FIG. 2, in contrast to the conventional transposition process 100 exemplarily shown in FIG. 1, a square matrix can be transposed in place, thereby saving both computer time and storage. That is, since a square matrix 201 has the same number of rows and columns, its transpose 202 can be readily formed in place by merely swapping values $a_{ij} \leftrightarrow a_{ji}$, with only the use of a single machine register. That is, this single register can be used by every $a_{ij}$ of A, $1 \le i, j \le n$ (e.g., all $n^2$ elements of A).

Hence, a key aspect of the present invention is to take advantage of this observation that a square matrix can be transposed in-place (e.g., within a cache). The present invention extends this in-place transposition by subdividing any matrix (e.g., a non-square matrix) into squares and performing in-place transposition on each square matrix.

The simple examples shown in FIGS. 4-10 demonstrate visually the method of the present invention operating on a matrix of any size by first subdividing the matrix into one or more square submatrices, executing an in-place square matrix transposition on each square matrix, and then reorganizing conceptually the transposed square submatrices by "concatenation" to form the transpose of the original matrix. Although these figures show very small matrices, it should be apparent that the sizes can be readily scaled to the much larger dimensions more realistic in actual practice, a point to be revisited later.

Thus, the present invention recognizes that a rectangular matrix can be considered as being a concatenation of square submatrices, from which a square submatrix is repeatably and sequentially determined until the entire original matrix is subdivided down into square submatrices (e.g., the final square matrices might well be two or more 1×1 square submatrices).

Each square submatrix is then transposed in-place, and the transpose of the original matrix is achieved by realizing how to reconnect the in-place transposed submatrices.

The advantages of using the square matrix in-place transposition process include both the saving of computer time (performance) and computer storage when this idea is applied to algorithms for dense linear algebra, as will be demonstrated shortly.

Although the above brief description suggests that the entire rectangular matrix be broken down into square submatrices, it usually is advantageous to stop the process before getting all the way down to a large number of smaller (e.g., 1×1) submatrices. That is, one might prefer to simply stop after one or two sequences of the in-place square transposition process and perform a transpose on the remainder by using the extra computer memory required for the remainder.

It should also be apparent to one of ordinary skill in the art, after taking the following discussion as a whole, that, although the largest square submatrices are found in the exemplary embodiment discussed, the underlying technique of the present invention also functions for divisions in which smaller square submatrices are found, albeit in a somewhat more complicated and less efficient manner. Using several square matrices of different orders leads to more complicated programs for working with this data representation of transpose.

EXEMPLARY METHOD OF THE INVENTION

Although a pattern will be readily apparent from the simplistic examples shown in FIGS. 4-10, an exemplary general algorithm for the technique of the present invention is provided in flowchart format 300 in FIG. 3 to provide better visibility to the examples shown in FIGS. 4-10.

In step 301, it is determined which dimension of the matrix is the greater. If the matrix row dimension M is greater than the column dimension N, then the left path of the flowchart is followed.

In step 302, the number q of order m square submatrices $A_i$ is determined. In step 303, q order N in-place transposes are executed.

In step 304, it is checked whether the entire matrix has been covered by square submatrices by checking the size of the remainder submatrix, if any.

If any remainder submatrix does exist, then in step 305, this remainder is defined as a new submatrix to be addressed to complete the transpose.

At this point, as shown in steps 306 and 307, the remainder could be transposed using conventional methods of transposing a rectangular matrix, similar in concept to that shown in FIG. 1. Alternatively, the newly-defined remainder submatrix could be used to begin back at step 301 for another pass through the process 300.

The corresponding process (e.g., steps 308-312) is similarly executed in the right path of the flowchart when N>M.

After matrix A has been completely broken down by square subsections $A_i$, and each of which has been transposed, then the transposed subsections $A_i'$ are re-assembled ("concatenated") to form the transposed matrix A'.

Although the term "concatenation" is used to describe the re-assembly of the transposed square submatrices, it is noted that the term is used loosely for purpose of this discussion, since "concatentation" often implies that the data would be actually physically placed adjacent to each other in memory. Since the present invention has a goal to save the transposed matrix in the original memory location of the original matrix, the re-assembly process is actually a mapping that identifies how the transposed submatrices are fitted together in the re-assembly process, rather than actually relocating square blocks of data to be physically adjacent in memory, as might be implied by "concatenation".

As will be better understood shortly from the visual examples shown in FIGS. 4-10, the concatenation steps for reforming the transposed matrix interconnection of the transposed submatrices $A_i'$'s can be considered as the complement of the division process used to form the submatrix $A_i$. That is, if the submatrix $A_i$ was obtained by splitting at a row (e.g., a "horizontal split"), then the concatenation process for transposed submatrix $A_i'$ will be for a column (e.g., a vertical concatenation, the complement of the horizontal split) concatenation. Likewise, if the submatrix $A_i$ was obtained by a column split (e.g., a "vertical split"), then the concatenation process for transposed submatrix $A_i'$ will be a row concatenation (e.g., a horizontal concatenation).

The exemplary generalized method shown in flowchart 300 will now be demonstrated by the simple examples of FIGS. 4-7.

In FIG. 4, the process 400 addresses matrix A, which is a 4×2 matrix 401 (e.g., M=4, N=2). It is clear that matrix A can be completely divided into two square submatrices 402, 403. It is noted that transposed matrix A' 404 is shown in the upper right of FIG. 4, for comparison with the result obtained by executing the steps of the present invention.

As previously mentioned, a more realistic matrix size would actually be 400×200 rather than the 4×2 example shown in FIG. 4.

In accordance with step 301 of FIG. 3, the left path of the flowchart is taken, since M=4 is greater than N=2. In accordance with step 302, q=2, and r=0.

Since r=0, in step 304, it is determined that the entire matrix data is covered by the two square submatrices 402, 403, so that the in-place square transposition completely takes care of the matrix data.

It is noted that, since each submatrix 402, 403 is respectively derived from matrix 401 along the horizontal dimension, then the formation of the transposed matrix data is achieved by considering the two in-place transposed submatrices 402, 403 as concatenated in the vertical dimension, as can be verified by comparing the in-place transpositions 405, 406 with the transposed matrix 404 in the upper right.

FIG. 5 shows a similar process 500 when 2×4 matrix 501 is processed using the right side of the flowchart 300 of FIG. 3. The transpose 502 is shown in the upper right for comparison. In this case, a column split is used to derive square submatrices 503, 504. Transposed square submatrices 505, 506 can then be interconnected by row concatenation to provide the transposed matrix 502 shown in the upper right of the figure.

Figure 6B:
FIG. 6B shows visually a second pass 607 through the flowchart 300 of the process 600 of the transposition technique to the 8×3 matrix A initially shown in FIG. 6A, using the remainder 2 by 3 submatrix from the first pass 603.
Figure 6C:
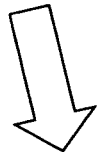
FIG. 6C shows visually a third pass 607 through the flowchart 300 of the process 600 of the transposition technique to the 8×3 matrix A initially shown in FIG. 6A, using the remainder 2 by 1 submatrix from the second pass 607 and finally broken down into square submatrices that completely cover an original matrix array data 601.

FIGS. 6A-6C show the transposition process 600 on an 8×3 matrix that is finally completely subdivided by going down to 1×1 square submatrices. The first pass 603 is shown in FIG. 6A, the second pass is shown in FIG. 6B, and the final, third pass is shown in FIG. 6C. The concatenation process 700 is shown in FIG. 7.

Figure 7:
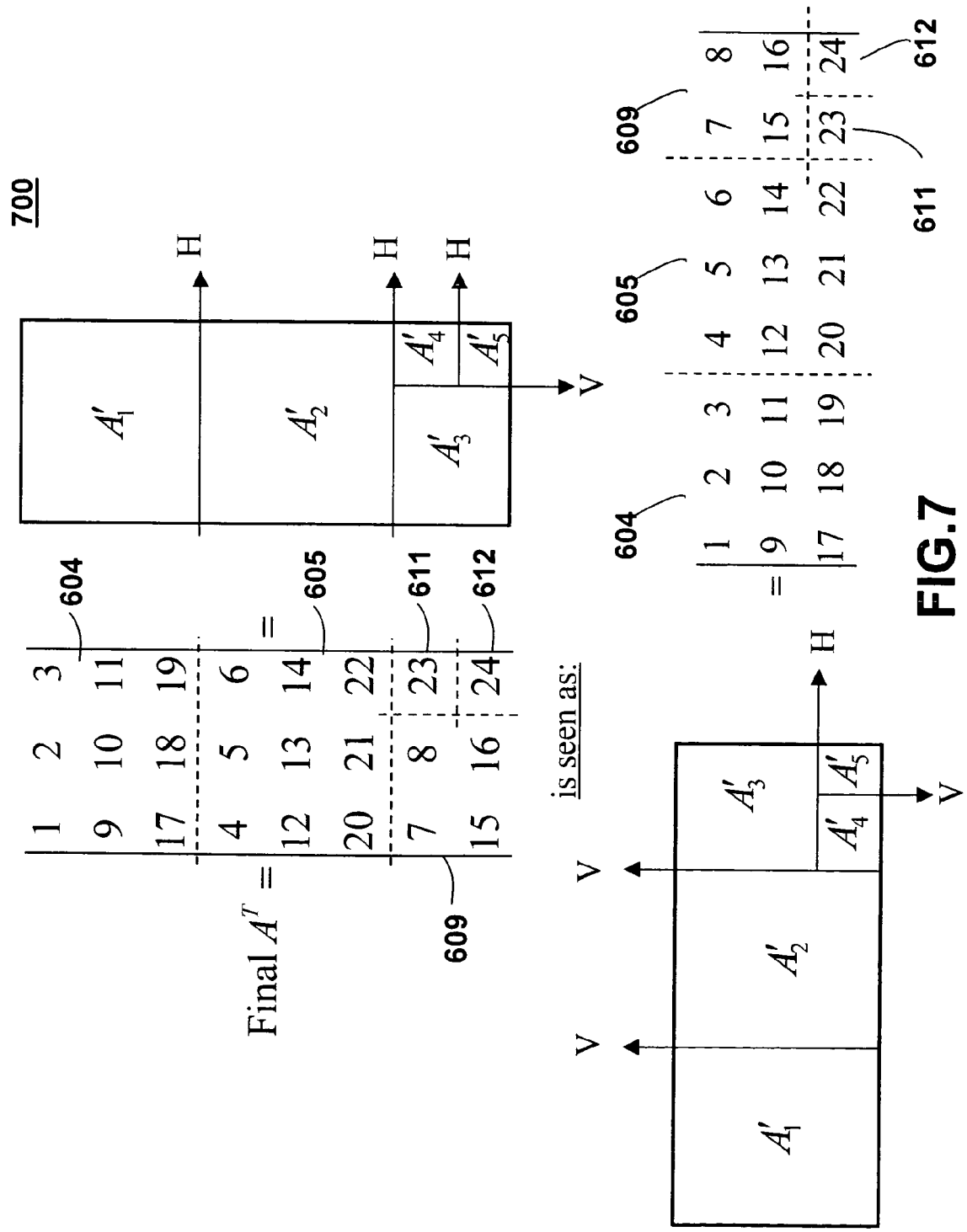
FIG. 7 shows visually a process 700 of how the transposed submatrices resultant from the process 600 in FIGS. 6A-6C are viewed as concatenated in the manner complementary to the manner in which the submatrices were split apart.

In FIG. 6A, the 8×3 matrix 601 is shown in correct transposed form 602 for comparison with the steps of the process shown in the first, second, and third passes and the concatenation shown in FIG. 7.

In the first pass 603 shown in FIG. 6A, M>N, so the left path of process 300 is taken, to result in two square submatrices 604, 605, with remainder 606. It is noted that the terminology "~" is a superscript notation that represents a submatrix relationship and that this terminology is used in a hierarchical manner in the subsequent passes, by using the terminology on top of itself to represent sub-submatrices, etc.

In the second pass 607 shown in FIG. 6B, the right path of process 300 is taken, since N>M, to result in one square submatrix 609 of size 2×2, with remainder 610. Finally, in the third pass 608 shown in FIG. 6C, the left path is again taken, since M>N, to result in two square submatrices 611, 612, each of size 1×1. It is noted that the process 300 recognizes that the matrix is completely covered in the third pass 608 because m2=N=1, as shown by the label 613.

FIG. 7 shows the concatenation process 700 for the 3-pass process 600 shown in FIGS. 6A-6C. As mentioned earlier, the concatenation process 700 is perhaps best characterized as a complementary process to the splitting process used in forming the square submatrices for the in-place square matrix transpose operation. As can be seen from FIG. 7, the in-place transposition has stored the transposed square sub-matrices 604, 605, 609, 611, 612 in the storage location of the original matrix array data. Therefore, the concatenation process 700 is more properly described as keeping track of how the transposed square submatrices are to be seen as interconnected to each other.

It is noted that submatrices $A_1$ and $A_2$ were derived in a horizontal split and, from the correct transpose matrix 602 (reference FIG. 6A), it is apparent that these two in-place transposed square submatrices $A_1'$ and $A_2'$ should be considered as interconnected in the complementary sense, meaning a vertical relationship, as shown in FIG. 7.

Initially, the final concatenation of the transposed submatrices $A_3'$, $A_4'$, and $A_5'$ would seem to be a bit more complicated until it is recognized that the concatenation should be defined as a nesting operation to be executed in the order reverse from the original subdivision to form the square submatrices.

Thus, since submatrices $A_3$, $A_4$, and $A_5$ are actually derived as a nesting operation in which $A_3$ is first derived by a horizontal split and then submatrices $A_4$ and $A_5$ are derived by a vertical split, which are then subsequently subdivided by another horizontal split.

To obtain the correct concatenation to construct the final transposed matrix 602, it can be seen that the concatenation stage will more logically proceed starting from the smallest submatrices and working backwards in the order of the splitting operations that derived the square submatrices.

Thus, in FIG. 7, transposed submatrices $A_4'$ and $A_5'$, derived by horizontal split would be concatenated by a vertical concatenation. Since $A_3$ and the combination of $A_4$, and $A_5$ were derived by a horizontal split, transposed submatrix $A_3'$ would be concatenated with the concatenated $(A_4', A_5')$ combination in a vertical concatenation.

Likewise, since the nested combination $(A_3, (A_4, A_5))$ was derived by a horizontal split, its nested concatenation $(A_3', (A_4', A_5'))$ would then be vertically concatenated with transposed $A_2'$. The resultant concatenation for the concatenated transpose matrix A' could be represented as $A'=(A_1')\,V\,(A_2')\,V\,[(A_3')\,H\,((A_4')\,V\,(A_5'))]$, where H signifies row concatenation and V signifies column concatenation.

Figure 8:
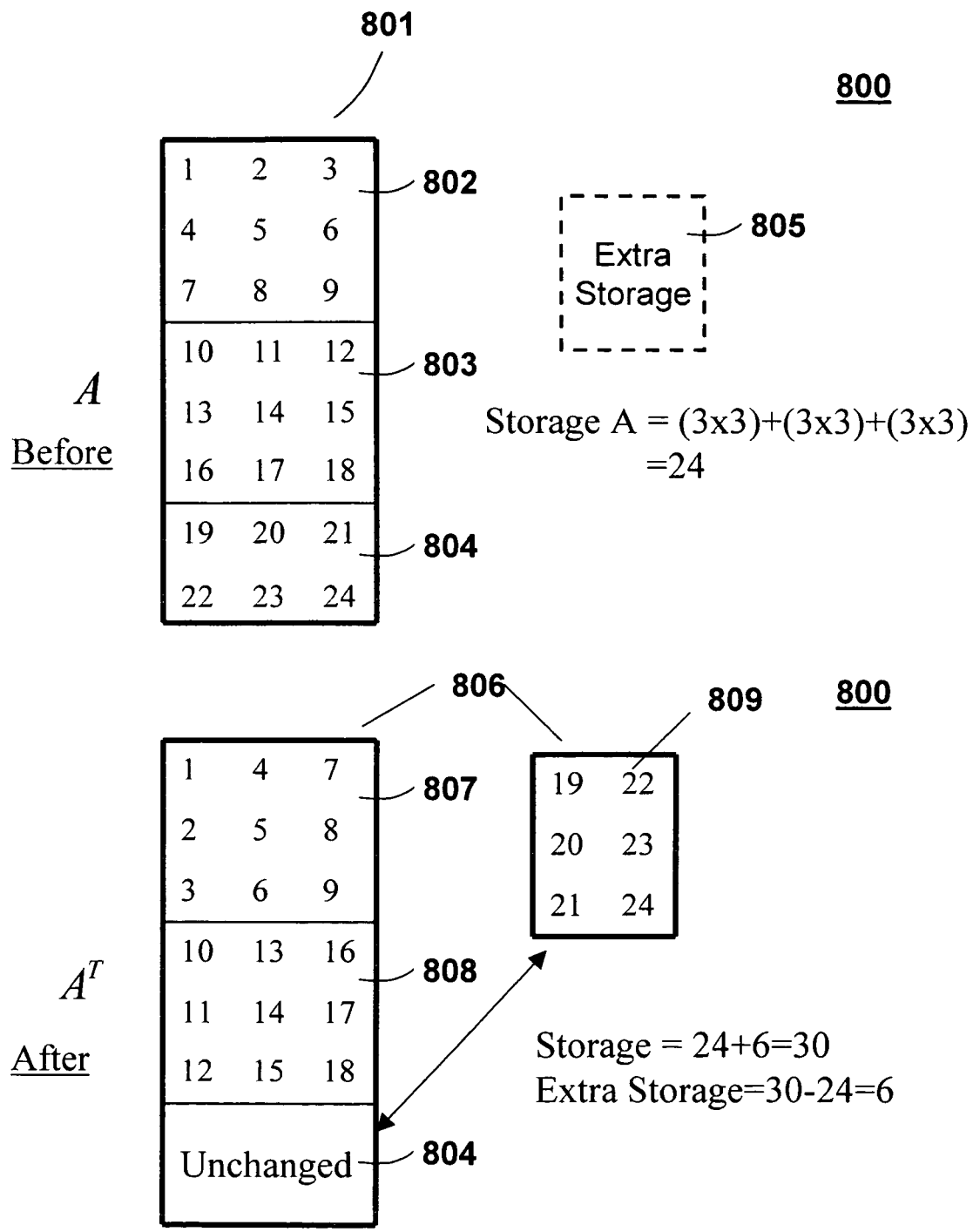
FIG. 8 shows visually a process 800 of the variation of the present invention in which is exemplarily demonstrated with a simple 8×3 matrix that the matrix need not be completely subdivided, but that additional extra memory for the remainder is much reduced from conventional transposition storage that requires storage of size 2 mn.
Figure 9:
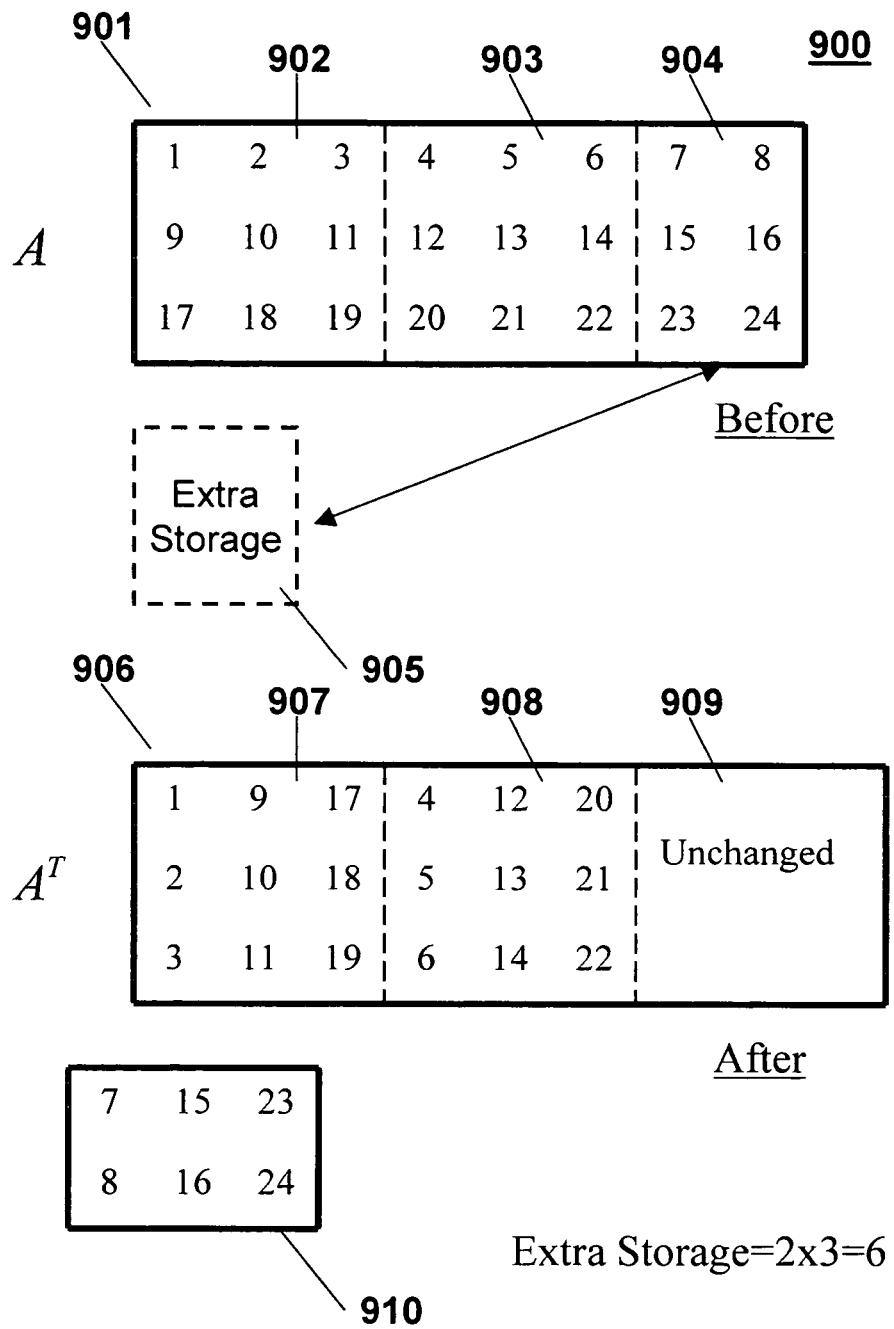
FIG. 9 shows visually a process 900 for a 3×8 matrix corresponding to that shown in FIG. 8.

FIGS. 8 and 9 shows a variation 800, 900 in which the matrix is not completely subdivided down to 1×1 square submatrices, but, rather, extra storage 805, 905 is allocated for the remainder rectangular submatrix resultant from one or more passes through the process 300.

As shown in FIG. 8, the 8×3 matrix 801 is subdivided into two square submatrices 802, 803, with a 2×3 remainder submatrix 804. Extra memory space 805 is reserved for the transposition of the remainder submatrix 804.

The transposed matrix 806, therefore, now consists of submatrices 807, 808, as stored in the original space when the in-place square transposition is executed. The transpose of the remainder submatrix 804 is now stored in the reserved memory space 805 as transposed submatrix 809. The original remainder submatrix 804 is unchanged. Because the original data space 801 of matrix A remains, it should be apparent that the extra storage requirement is of the same size as the original remainder submatrix 804, resulting in a total memory requirement of 30 spaces, which is 6 more spaces more than the original matrix data.

FIG. 9 shows the corresponding example of a 3×8 matrix subdivided into two submatrices and the remainder transposed submatrix 910 stored in extra memory space 905.

Figure 10:
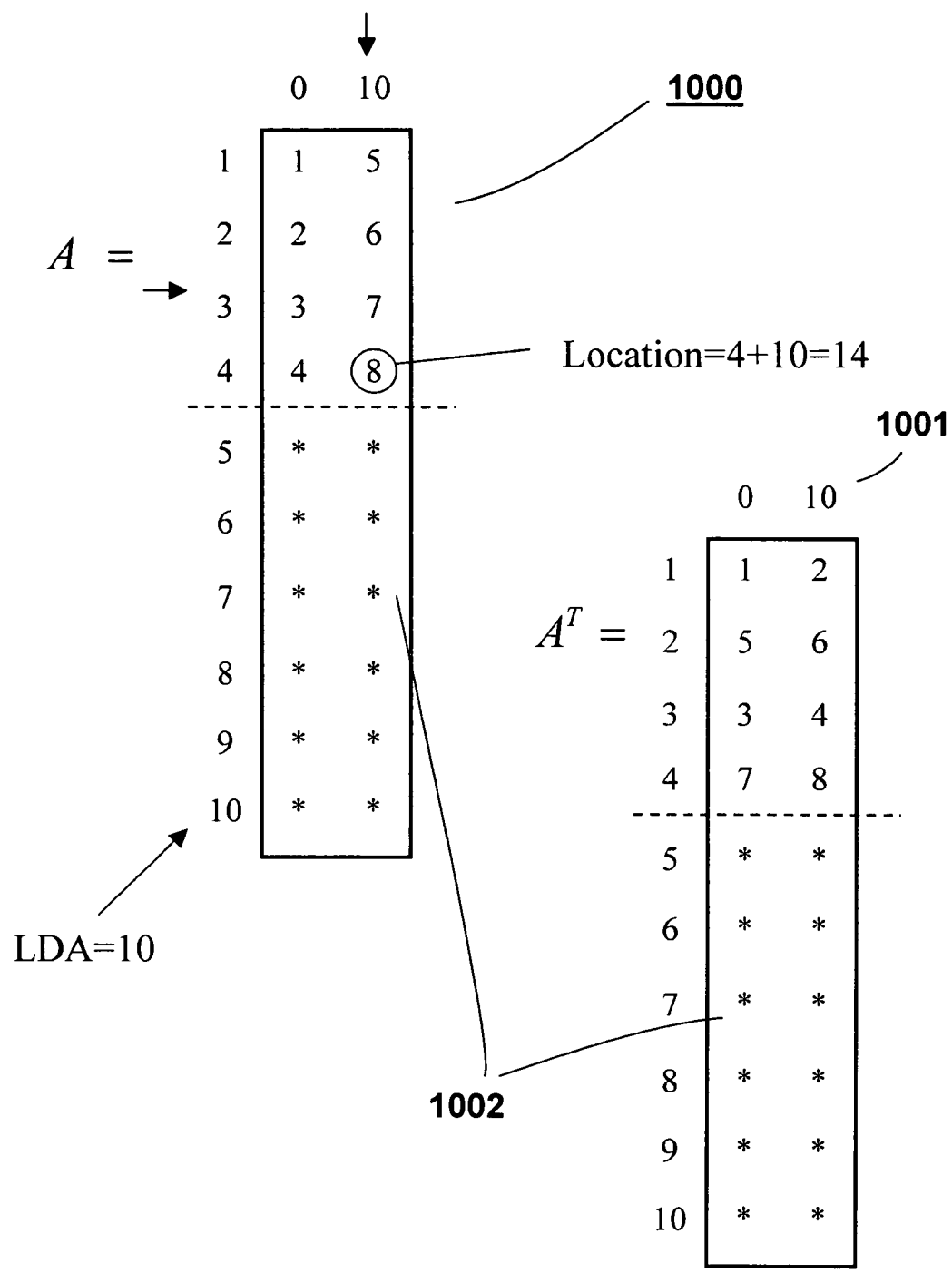
FIG. 10 shows visually an example 1000 that demonstrates how the extra storage requirement is affected by the leading dimension (LDA) parameter.

FIG. 10 shows the concept for the LDA parameter that results from the standard column (row) major order used by the Fortran (and C) programming languages. The LDA parameter shows up as follows: Let matrix A have M rows and N columns. From here on, only Fortran is considered, since the considerations are similar in C. If say, M=100 and N=50, then A would be declared as DIMENSION A(100, 50). The Fortran language places element A(I,J) of A at position I+LDA (J−1) of array A, where LDA is the Leading Dimension of the Array. In the example, LDA=100. Thus, relative to A(1,1), element A(I,J) is at location I−1+LDA(J−1).

Let A1 represent a submatrix of A of order m by n starting at location (i, j) of A. Note that A1(1:m, 1:n) is identical to A(i: i+m−1, j: j+n−1). Thus, to obtain the (k, l) element of A1, element (i+k−1, j+l−1) of A is selected, which is at location i+k−1+LDA(j+l−2) of array A. Also note that A1(1,1) is at location i+LDA(j−1) of A and, hence, relative to location (1,1) of A1, A1(k,l) is at location k−1+LDA(l−1).

This explains a very strong feature of Fortran and C storage of matrices: For any matrix A, all of its submatrices (this includes A itself) possess a uniform formula (i+(j−1)lda) for where their (i,j) elements reside in the array holding its elements. In any case, the algorithms presented in this invention must obey this convention when it operates on routines of the Fortran and C languages.

Thus, in FIG. 10, matrix A 1000 is shown as occupying storage that is 10×2=20 spaces, even though the data actually fills only 4×2=8 spaces in this example, and there is a remainder 1002 of "don't cares". The in-place square transposition 1001 would result in two 2×2 square submatrices concatenated in the original storage space. The remaining rows 5-10 are "don't cares" that are to be ignored as data.

From FIG. 10, it can be seen that one purpose of the LDA parameter is that of providing a coordinate identification method for the matrix data in the computer language indices used to store the matrix array. That is, the LDA acts as a base number for a coordinate identification scheme in which, for example, the location at row 4 and column 2 ("10") can be identified as location "4+10"="14". This coordinate system can be useful in the concatenation process in which the sub-matrices are interrelated to represent the completed transposed matrix.

The LDA parameter is typically set by the original programmer on a range of the number of rows of matrix data, such that, for example, as shown in FIG. 10, the LDA of matrices having no more than 10 rows would have LDA=10.

Returning to the examples shown in FIGS. 6A-9, it should be apparent that the simple examples of these figures can be extended to any size. Let matrix A have order M by N where, without loss of generality, it is assumed M≥N. So, M=qN+r, q≥1 and 0≤r<N. It is said that A is a "concatenation of A1 and A2 along the row dimension of A" where A1 is qN by N and A2 is r by N.

To compute C=A' (where "'" denotes transpose), C=($A_1$', B) is computed, where B=$A_2$'. Here (X,Y) is a concatenation of matrices X and Y in the column dimension of X and Y. It is noted that $A_1$' and B occupy different space. Both space and computer time is saved by the new method.

Performance is saved in the method of the present invention because of the following. As previously mentioned, the conventional method requires storage for 2*M*N storage locations. In contrast, the method of the present invention requires M*N+rN storage.

The savings of $qN^2$ is always positive. Out-of-place transposition requires 2*M*N loads and M*N stores. The extra M*N loads happen because lines of the target matrix B (=A') are loaded into the L1 cache before their storing takes place. In-place transposition on q square matrices requires $qN^2$ loads and stores. Thus, to first approximation, the performance gain of the new method is $qN^2$ loads.

If loads and stores are counted equally, and if M nearly equals N (i.e., q=1 and r<<N), then the performance gain is 50%. The amount of extra storage required is rN and the fraction saved over the existing method is r/M. The above description applies to standard row or column major storage.

For square block storage the results are usually better, as follows. Again, it is assumed that A is an M by N matrix. Matrix A is represented as an $m_1$ by $n_1$ block matrix, where each block has space for NB by NB locations. Here $m_1$=(M+NB−1)/NB and $n_1$=(N+NB−1)/NB. The bottom block row contains $n_1$−1 rectangular submatrices of size $m_2$ by NB and the last block column contains $m_1$−1 rectangular submatrices of size NB by $n_2$ and the lower right corner block is $m_2$ by $n_2$. Here $m_2$=M+NB−$m_1$*NB and $n_2$=N+NB−$n_1$*NB. If necessary, $m_2$ and $n_2$ is padded up so that both $m_2$ and $n_2$ are an integral number of register block sizes mb and nb.

The $m_1$+$n_1$−1 border rectangular matrices will always fit inside storage of NB**2 locations. There are ($m_1$−1)*($n_1$−1) regular full square blocks and $m_1$+$n_1$−1 border rectangular blocks. Referring to the initial paragraph it should be clear that C also fits in the NB*NB locations assigned to each border block.

To help clarify ideas, let M=673, N=384, NB=100 and mb=nb=4. Then padding increases $m_2$ to 76 from 73 but $n_2$ remains 84. Here $m_1$=7 and $n_1$=4. The amount of extra storage required is $m_1$*$n_1$*$NB^2$−M*N which is 21,568 locations or 8.35%. In the above example with conventional storage, the extra storage required is 42.94%. It is noted that these numbers are more realistic matrix dimensions that those exemplarily shown in the figures.

Minimal Storage Transpose

As has been previously indicated (e.g., see FIG. 3), it is possible with additional programming complexity to reduce the additional storage requirement to zero. Again it is supposed that M≥N, as shown in FIG. 3. The Euclidean Algorithm is applied to (M, N). It is noted that each application of the Euclidean Algorithm is one pass through the steps of FIG. 3.

$$M=q1*N+R$$

$$N=q2*R+S$$

*

*

*

$$G=qk*T+0$$

G is equal to GCD(M,N), where GCD stands for the greatest common denominator. There are k steps of FIG. 3 and one obtains q1 square matrices of order N, q2 matrices of order R, . . . , qk matrices of order G. It is easy to verify that these q1+q2+ . . . +qk square matrices tile A completely. Again, the above M=673 and N=384 example is used.

(Original M=673, N=384)

q1=1, N=384 ($1^{st}$ pass of FIG. 3, left over is M=289, N=384)

q2=1, R=289 ($2^{nd}$ pass of FIG. 3, left over is M=289, N=95)

q3=3, R=95 ($3^{rd}$ pass of FIG. 3, left over is M=4, N=95)

q4=23, R2=4 ($4^{th}$ pass of FIG. 3, left over is M=4, N=3)

q5=1, R3=3 ($5^{th}$ pass of FIG. 3, left over is M=1, N=3)

q6=3, G=1 and ($6^{th}$ pass of FIG. 3, left over is M=0, N=0)

1*384*384=147,456

1*289*289=83,521

3*95*95=27,075

23*4*4=368

1*3*3=9

3*1*1=3

Sum=258,432=M*N

The minimal storage idea could also be combined with square blocking. Then it is applied to a block matrix of order $m_1$ by $n_1$. In the illustrative example $m_1$=4 and $n_1$=4. With square blocking, the minimal squares are guaranteed to have order G*NB. Since G≥1, it can be seen that the matrices will never be too small.

Applying the Euclidean algorithm to $m_1$=7 and $n_1$=4, there would be one square block of order 4*NB (e.g., 16 NB×NB blocks), one of order 3*NB (e.g., 9 NB×NB blocks) and 3 of order NB (e.g., 3 NB×NB blocks). Clearly, 16+9+3 NB×NB blocks exhaust seven times four or 28 NB×NB blocks.

Software Implementation

Figure 11:
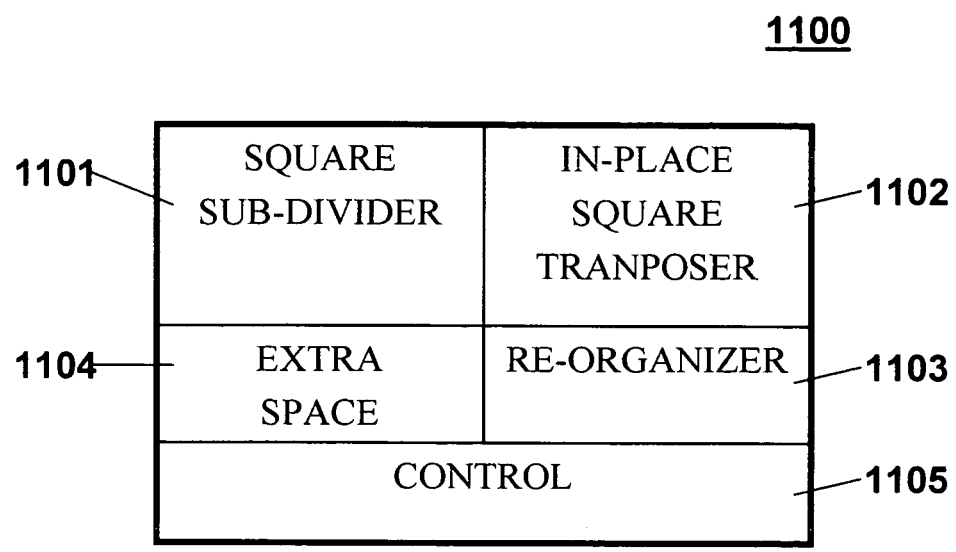
FIG. 11 shows an exemplary block diagram 1100 of a software module that might be implemented to execute the transposition technique of the present invention.

FIG. 11 shows an exemplary software program block diagram 1100 that might be used to implement the method of the present invention. It is noted that FIG. 3 and FIG. 11 are related.

Square sub-divider module 1101 determines how to subdivide the matrix into one or more square matrices. In-place square transposer module 1102 uses one or more registers to perform the in-place square matrix operation on each of the square submatrices.

Re-organizer module 1103 keeps track of how the transposed submatrices are to be "concatenated" to form the transposed matrix. As pointed out above, the re-organizer module 1103 might simply keep track of how each square transposed matrix block is to be oriented with other square blocks of transposed matrix data. This tracking could be as simple as merely a data structure that identifies the square submatrix upper-left corner coordinate, the matrix dimension, and a coding that represents a relationship with other square submatrices.

Extra space module 1104 determines the extra memory space to be secured based on, for example, the matrix LDA, and, optionally, to continue the square matrix in-place transposition process in the extra memory space until the entire matrix has been completely subdivided into square matrices.

Control module 1005 oversees the invocation of the four modules 1001, 1002, 1003, 1004 described above, as well as possibly performing higher level housekeeping tasks, such as memory allocation for the extra memory space. The control module might also have the task of rearranging the resultant transposed data into stride one format, if desired.

Hardware Implementation

FIG. 12 illustrates a typical hardware configuration of an information handling/computer system in accordance with the invention and which preferably has at least one processor or central processing unit (CPU) 1211.

The CPUs 1211 are interconnected via a system bus 1212 to a random access memory (RAM) 1214, read-only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1226, speaker 1228, microphone 1232, and/or other user interface device to the bus 1212), a communication adapter 1234 for connecting an information handling system to a data processing network, the Internet, an Intranet, a personal area network (PAN), etc., and a display adapter 1236 for connecting the bus 1212 to a display device 1238 and/or printer 1239 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media used as storage.

Thus, this aspect of the present invention is directed to a programmed product, comprising signal-bearing storage media tangibly embodying a program of machine-readable instructions executable by a digital data processor incorporating the CPU 1211 and hardware above, to perform the method of the invention.

This signal-bearing storage media may include, for example, a RAM contained within the CPU 1211, as represented by the fast-access storage for example. Alternatively, the instructions may be contained in another signal-bearing storage media, such as a magnetic data storage diskette 1300 (FIG. 13), directly or indirectly accessible by the CPU 1211.

Whether contained in the diskette 1300, the computer/CPU 1211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including instructions formatted for transmission media, such as digital and analog formats, and storage devices in communication links and wireless devices. In an illustrative embodiment of the invention, the machine-readable instructions may comprise software object code.

The second exemplary aspect of the present invention additionally raises the issue of general implementation of the present invention in a variety of ways.

For example, it should be apparent, after having read the discussion above that the present invention could be implemented by custom designing a computer in accordance with the principles of the present invention. For example, an operating system could be implemented in which linear algebra processing is executed using the principles of the present invention.

In a variation, the present invention could be implemented by modifying standard matrix processing modules, such as described by LAPACK, so as to be based on the principles of the present invention. Along these lines, each manufacturer could customize their BLAS subroutines in accordance with these principles.

It should also be recognized that other variations are possible, such as versions in which a higher level software module interfaces with existing linear algebra processing modules, such as a BLAS or other LAPACK or ScaLAPACK module, to incorporate the principles of the present invention.

Moreover, the principles and methods of the present invention could be embodied as a computerized tool stored on a memory device, such as independent diskette 1300, that contains a series of matrix subroutines to solve scientific and engineering problems using matrix processing, as modified by the technique described above. The modified matrix subroutines could be stored in memory as part of a math library, as is well known in the art. Alternatively, the computerized tool might contain a higher level software module to interact with existing linear algebra processing modules.

It should also be obvious to one of skill in the art that the instructions for the technique described herein can be downloaded through a network interface from a remote storage facility.

All of these various embodiments are intended as included in the present invention, since the present invention should be appropriately viewed as a method to enhance the computation of matrix subroutines, as based upon recognizing how linear algebra processing can be more efficient by using the principles of the present invention.

In yet another exemplary aspect of the present invention, it should also be apparent to one of skill in the art that the principles of the present invention can be used in yet another environment in which parties indirectly take advantage of the present invention.

For example, it is understood that an end user desiring a solution of a scientific or engineering problem may undertake to directly use a computerized linear algebra processing method that incorporates the method of the present invention. Alternatively, the end user might desire that a second party provide the end user the desired solution to the problem by providing the results of a computerized linear algebra processing method that incorporates the method of the present invention. These results might be provided to the end user by a network transmission or even a hard copy printout of the results.

The present invention is intended to cover all of these various methods of implementing and of using the present invention, including that of the end user who indirectly utilizes the present invention by receiving the results of matrix processing done in accordance with the principles herein.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of improving at least one of an efficiency and a speed of a linear algebra processing on a computer, said method comprising:
   downloading an application program from a memory of said computer holding one or more application programs in storage for execution by said computer, said application program directed to an application having at least one processing involving a linear algebra processing of matrix data; and
   executing said application program on a processor of said computer,
   wherein said application program accesses a library accessible to said processor of subroutines for said linear algebra processing, said library including a subroutine for performing an in-place data transposition processing of matrix data stored in a memory of said computer that stores data during execution of said application program, said subroutine comprising a method for transposing data of a rectangular matrix A to form a transpose A' of said matrix A, said method comprising:
   determining, using a processor on said computer, a largest order square submatrix within a residual of said rectangular matrix A not yet transposed;
   subdividing said residual of said rectangular matrix A into one or more square submatrices $A_{ij}$, each having said largest order;
   executing an in-place transposition of each of said square submatrices $A_{ij}$; and
   storing said transposed square submatrices $A_{ij}$ in a memory as data structures representing said transposed square submatrices, said data structures mapped as being concatenated in a formation of said transpose A'.

2. The method of claim 1, wherein said transposed data is stored in a format that can be retrieved as contiguous transposed data in a stride one memory retrieval.

3. The method of claim 1, wherein said subdividing and said in-place transposition are iteratively executed over a remaining portion of the subdivided rectangular matrix A, such that said remaining portion and said residual largest order square submatrix becomes progressively smaller.

4. The method of claim 3, wherein the repetitive iteration of said in-place transposition is stopped at a stage before said rectangular matrix A is completely subdivided into square submatrices, said method further comprising reorganizing a remaining portion of data in said matrix A in a corresponding portion of said memory allocated for storing a transposed version of said remaining portion of data.

5. The method of claim 3, wherein the iterative subdivision and said in-place transpositions are continued until said rectangular matrix A is completely subdivided into square submatrices, including any of a final stage wherein the largest order square submatrix is 1×1.

6. The method of claim 1, further comprising:
   establishing a mapping to re-orient said transposed square submatrices $A_{ij}'$ as representing transposed rectangular matrix A'.

7. The method of claim 6, wherein the re-orienting is executed in an order reverse from said subdividing.

8. The method of claim 7, wherein, if a column direction and a row direction of said rectangular matrix A are considered as complements of each other, then said mapping to re-orient each transposed square submatrices $A_{ij}'$ to form transposed rectangular matrix A' comprises a re-orienting of said transposed submatrices $A_{ij}'$ in a complement relationship from a manner in which said square submatrices $A_{ij}$ were subdivided from said rectangular matrix A.

9. The method of claim 1, wherein said in-place transposition comprises a swapping of submatrix elements via a register.

10. The method of claim 1, as embedded in a subroutine executing a matrix operation.

11. The method of claim 10, wherein said subroutine comprises a part of a Basic Linear Algebra Subprograms (BLAS).

12. A computer, comprising a memory system to store:
    matrix data to be transposed;
    a square sub-divider module, as comprising a set of instructions to be executed by a processor of said computer, to subdivide said matrix data into at least one square submatrix; and
    an in-place square transpose module, as comprising a set of instructions to be executed by said processor, to transpose each said at least one square submatrix to form a transposed square submatrix,
    wherein said square sub-divider module determines a size of a largest square submatrix of a residual amount of said matrix data not yet transposed and uses said determined size for the subdividing, and
    wherein said square sub-divider module and said in-place square transpose module are stored in a library of subroutines, as available to an application being executed on said computer and having at least one processing involving a linear algebra processing of matrix data.

13. The computer of claim 12, further comprising:
    a re-organizer module, as executed by said processor, to determine how each said transposed square submatrix is fitted back to form a transposed matrix data.

14. The computer of claim 13, further comprising:
    an extra space module, as executed by said processor, to determine an amount of extra memory space to be reserved for a residual portion of said matrix data; and
    a control module to supervise and coordinate an operation of said square sub-divider module, said in-place square transpose module, and said re-organizer module.

15. A non-transitory storage medium tangibly embodying a program of machine-readable instructions executable by a digital processing apparatus to perform a method of transposing data of a matrix, said instructions comprising at least one of:
    a square sub-divider module to determine a largest residual square submatrix in a matrix stored as matrix data in a memory, said matrix data associated with an application program that will use said matrix data as data for processing and that includes at least one processing involving a linear algebra processing of said matrix data, and to subdivide said matrix data into at least one square submatrix;
    an in-place square transpose module to transpose each said at least one square submatrix to form a transposed square submatrix;
    a re-organizer module to determine how each said transposed square submatrix is fitted back to form transposed matrix data;
    an extra space module to determine an amount of extra memory space to be reserved for a residual portion of said matrix data; and
    a control module to supervise and coordinate an operation of one or more of said square sub-divider module, said in-place square transpose module, said re-organizer module, and said extra space module,
wherein said square sub-divider module, said in-place square transpose module, said re-organizer module, said extra space module, and said control module are stored as components in one of:
- a library of subroutines available to said application program for processing said at least one processing involving a linear algebra processing;
- a library of subroutines available to a kernel that defines an execution of said linear algebra processing; and
- at least one subroutine in said application program.

16. The storage medium of claim 15, wherein said instructions are encoded on a stand-alone diskette intended to be selectively inserted into a computer drive module.

17. The storage medium of claim 15, wherein said instructions are stored in a computer memory.

18. The storage medium of claim 17, wherein said computer comprises a server on a network, said server at least one of:
- making said instruction available to a user via said network; and
- executing said instructions on data provided by said user via said network.

19. An apparatus, comprising:
- means for subdividing a matrix data into one or more square submatrices of data, said matrix having size m×n, where m and n are two integers, including means to determine a largest square submatrix of a residual amount of matrix data not yet transposed;
- means for executing an in-place square matrix transposition of data subdivided from said matrix data; and
- means for selectively repeating said subdividing by determining a remaining largest square submatrix and executing said in-place square matrix transposition until said matrix data is completely transposed,
wherein said means for subdividing a matrix data, said means for executing an in-place square matrix transposition, and said means for selectively repeating said subdividing comprise subroutine components in a library of subroutines that are available to an application program executing on said apparatus, said application program having at least one processing involving a linear algebra processing of matrix data.

20. An apparatus according to claim 19, further comprising:
- means for re-organizing a result of said in-place square matrix transposition to form a transposed matrix data of said matrix data.

* * * * *